United States Patent [19]

McCallion

[11] Patent Number: 4,736,290
[45] Date of Patent: Apr. 5, 1988

[54] MICROPROCESSORS

[75] Inventor: Ian M. McCallion, Hampshire, England

[73] Assignee: International Business Machines Corporation, Armonk, N.Y.

[21] Appl. No.: 873,904

[22] Filed: Jun. 13, 1986

[30] Foreign Application Priority Data

Jun. 18, 1985 [GB] United Kingdom ............ 85304346

[51] Int. Cl.⁴ .......................................... G06F 12/12
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,737,860 | 6/1973 | Sporer | 340/172.5 |
| 4,030,073 | 6/1977 | Armstrong, Jr. | 340/172.5 |
| 4,045,782 | 8/1977 | Anderson et al. | 364/200 |
| 4,121,286 | 10/1978 | Venton et al. | 364/200 |
| 4,153,933 | 5/1979 | Blume, Jr. et al. | 364/200 |
| 4,179,735 | 12/1979 | Lodi | 364/200 |
| 4,228,502 | 10/1980 | Wagasugi | 364/200 |
| 4,302,809 | 11/1981 | Drogichen | 364/200 |
| 4,340,932 | 7/1982 | Bakula et al. | 364/200 |
| 4,368,515 | 1/1983 | Nielsen | 364/200 |
| 4,374,411 | 2/1983 | Heatherington | 364/200 |
| 4,382,279 | 5/1983 | Michel Ugon | 364/200 |
| 4,403,283 | 9/1983 | Myntti et al. | 364/200 |
| 4,443,847 | 4/1984 | Bradley et al. | 364/200 |
| 4,445,170 | 4/1984 | Hughes et al. | 364/200 |
| 4,450,524 | 5/1984 | Oberman | 364/200 |
| 4,527,251 | 7/1985 | Nibby, Jr. | 364/900 |
| 4,528,648 | 7/1985 | Lew | 364/200 |
| 4,580,212 | 4/1986 | Hosaka | 364/200 |
| 4,608,632 | 8/1986 | Kummer | 364/200 |

FOREIGN PATENT DOCUMENTS 0055553 7/1982 European Pat. Off. .

Primary Examiner—Gareth D. Shaw
Assistant Examiner—Viet O. Nguyen
Attorney, Agent, or Firm—Robert L. Troike

[57] ABSTRACT

A microprocessor that has two operating modes for generating memory location addresses includes a processor 20 connected to a read-only memory 21, a random access memory 22, and an I/O unit 23 through control 25, data 26 and address 27 buses. A remapper unit 24 is connected in the address bus between the processor 20 and the read only memory and the random access memory so that when it is enabled by a signal from the I/O unit it can selectively change addresses generated by the processor and thus redirect the control of the microprocessor.

8 Claims, 2 Drawing Sheets

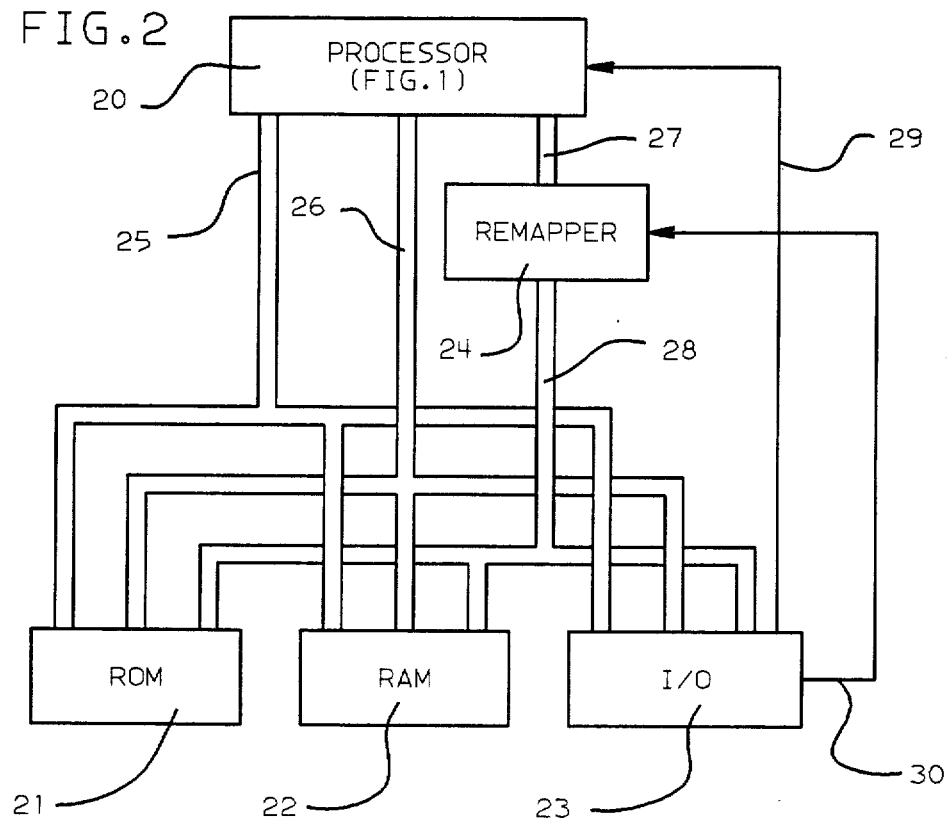
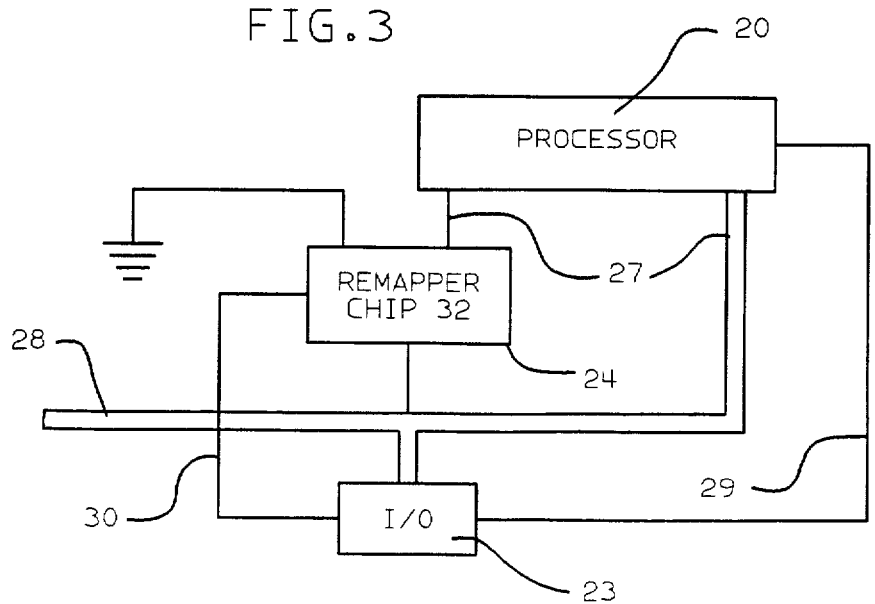

MICROPROCESSORS

BACKGROUND OF THE INVENTION

1. Field of the Invention

This invention relates generally to improvements in microprocessors and in particular to apparatus and a method for switching the operating mode of a microprocessor to allow a more efficient use of the machine.

2. Description of the Prior Art

Microprocessors are defined as the physical realization of the central processing unit of a computr system on either a single chip of semiconductor or a small number of chips, (New Penguin Dictionary of Electronics, 1979). Microprocessors usually consist of an arithmetic and logic unit, a control unit and a memory unit. Microprocessors are characterized by speed, word length, architecture and instruction set, which may be either fixed or microprogrammed. The combination of these characteristics determines the performance of the processor.

Most microprocessors have a fixed instruction set. Microprogrammed processors have a control store containing the microcode or firmware that defines the processor's instruction set; such processors may either be implemented on a single chip or constructed from bit-slice elements.

The processor's architecture determines what register, stack and I/O facilities are available, as well as defining the processor's primitive data types and how addresses are derived from its registers. The data types, which are the fundamental entities that can be manipulated by the instruction set, typically include bit, nibble (4 bits), byte (8 bits), word (16 bits), and on the latest microprocessors, double words (32 bits). A word is usually defined as the number of bits in the processor's internal data bus rather than always being 16 bits. Instructions generally include arithmetic logical, flow-of-control, and data movement (between stacks, registers, memory, and I/O ports).

The first microprocessor, the four-chip set Intel 4004, appeared in 1971.

It was a calculator that could implement a simple set of instructions in hardware but permitted complex sequences of them to be stored in a read-only memory (ROM). It has a four-chip set consisting of a CPU, ROM, RAM, and a shift-register chip. The Intel 4004 had a 4-bit data bus, could address 4.5K bytes of memory, and had 45 instructions. Its 8-bit counterpart, the Intel 8008, was introduced in 1974 and its improved derivative, the Zilog Z-80, in 1976.

Current microprocessors include the Zilog Z8000, Motorola 68000, Intel 8086, National 16000, as well as the older Texas Instruments 9900 and Digital Equipment Corporation LSI-11. All of these chips use a 16-bit-wide external data bus. Still higher performance microprocessors using 32-bit external data busses are now beginning to appear.

An article in the IBM Journal of Research and Development, Vol. 29, No. 2, March 1985 entitled "Microprocessors in Brief", by Robert C. Stanley, gives an overview of the past, present, and future of microprocessors and describes the key elements of their structure and operation.

One of the problems that has arisen through the development of families of microprocessors is maintaining compatibility between succeeding generations so that programs developed to run on earlier machines are also able to run on later processors while, at the same time, new programs are able to make use of extended features, such as larger memory capacity.

An example of this problem is found in the IBM Personal Computer (IBM PC) and compatible machines. (IBM is a Registered Trademark). The original IBM PC used the Intel 8088 processor and had a random access memory (RAM) of 640K bytes. A recent version of the IBM PC, the PC/At, uses the more powerful Intel 80286 microprocessor and can have up to 14.6M bytes of RAM.

The 80286 has the same instruction set as the 8088 with some extensions, and has two modes of operation, 'real' mode and 'protected' mode. The modes define the method of deriving addresses from the contents of registers. In real mode addresses are derived in exactly the same way as is used in the 8088 with the result that programs written for the 8088 will work on the 80286 in real mode, but with no access to the additional memory.

In protected mode a different method of deriving addresses is used which allows access to all memory of the machine, but unfortunately prevents programs not specifically designed to operate on the processor in protected mode from working.

It may be noted here that other methods of increasing the addressing capability of a microprocessor have been devised. For example, as reported in PC WEEK, 30 Apr. 1985, Intel and Lotus are making available for the IBM PC a special memory card with up to 4 Meg of memory utilizing 'bank switching', and Lotus is providing special versions of its software that exploit the additional memory. This method has the advantage that it can be used on existing PCs but it too appears to require programs to be changed to exploit the additional memory.

It is of course possible to modify programs so that they will run in protected mode, and many programs will be so modified. However, while popular application programs have not been modified the computer system must be able to run these modified programs; in other words it must be possible to switch modes.

The 80286 provides an instruction to switch from real to protect mode, but does not provide an instruction to switch back.

Therefore to switch from protected to real mode requires circuitry external to the 80286 to cause a reset of the 80286.

Reset of a microprocessor is caused by applying a pulse to its RESET input. The microprocessor clears all its internal registers and begins to fetch instructions from a fixed address. This address will usually be a Read-only Memory of the computer system and will contain the first instruction of the power on routine which checks out the basic operation of the processor and other parts of the computer system. When the computer is first turned on, external circuitry generates a RESET pulse for the microprocessor after all power levels are stable.

The IBM Personal Computer AT uses reset for mode switching, and incorporates a. circuits to trigger the RESET pulse from a program
  b. circuits to register the fact that the RESET is for the purpose of mode switch, so that after some amount of testing has been performed, the processor can determine whether to proceed with checkout and then initialize the system or whether to complete a mode switch.

c. a routing in ROM which obtains control immediately after RESET and does the following:
  1. performs the basic testing of the microprocessor
  2. tests the modes switch register (b). If not set, continues with normal power-on sequence, Else
  . . .
  3. determines the address of the modeswitch routine in RAM
  4. branches to the modeswitch routine (Step 1 here takes considerable time and is unnecessary when mode switching, so it might be suggested that this routine could be improved by reversing the order of steps 1 and 2. This would be considered poor practice in modern computer systems because an error that would cause a diagnostic check in step 1 may lead to an invalid outcome of step 2.)

SUMMARY OF THE INVENTION

It is an object of the present invention to provide a solution to the problem of switching modes in microprocessors that is faster than the solution described above that is embodied in the IBM Personal Computer AT.

The additional speed is achieved by avoiding the need to execute the power on routine, and this is achieved by additional hardware circuitry referred to as a remapper. The mode switch registering circuits are dispensed with in this invention.

The remapper changes some addresses coming out of the microprocessor before they reach the memory. In particular the startup address is changed so that the first instruction executed after reset is in the mode switching routine instead of the power on routine.

According to the invention there is provided a microprocessor comprising a processor unit, a read only memory, a random access memory and an input-output unit connected by a control bus, a data bus and an address bus and which has at least a first mode and a second mode of operation for the generation of memory location addresses, characterized in that the microprocessor also includes a read only memory and the random access memory remapper unit connected in the address bus between the processor unit and the, said remapper unit responsive to an enable signal to selectively change address words generated by the processor.

BRIEF DESCRIPTION OF THE DRAWINGS

In order that the invention may be fully understood a preferred embodiment thereof will now be described with reference to the accompanying drawings, in which:

FIG. 2 is a simplified block schematic of a microprocessor system embodying the invention.

FIG. 3 illustrates the preferred embodiment of the remapper.

DETAILED DESCRIPTION

Figure 1:
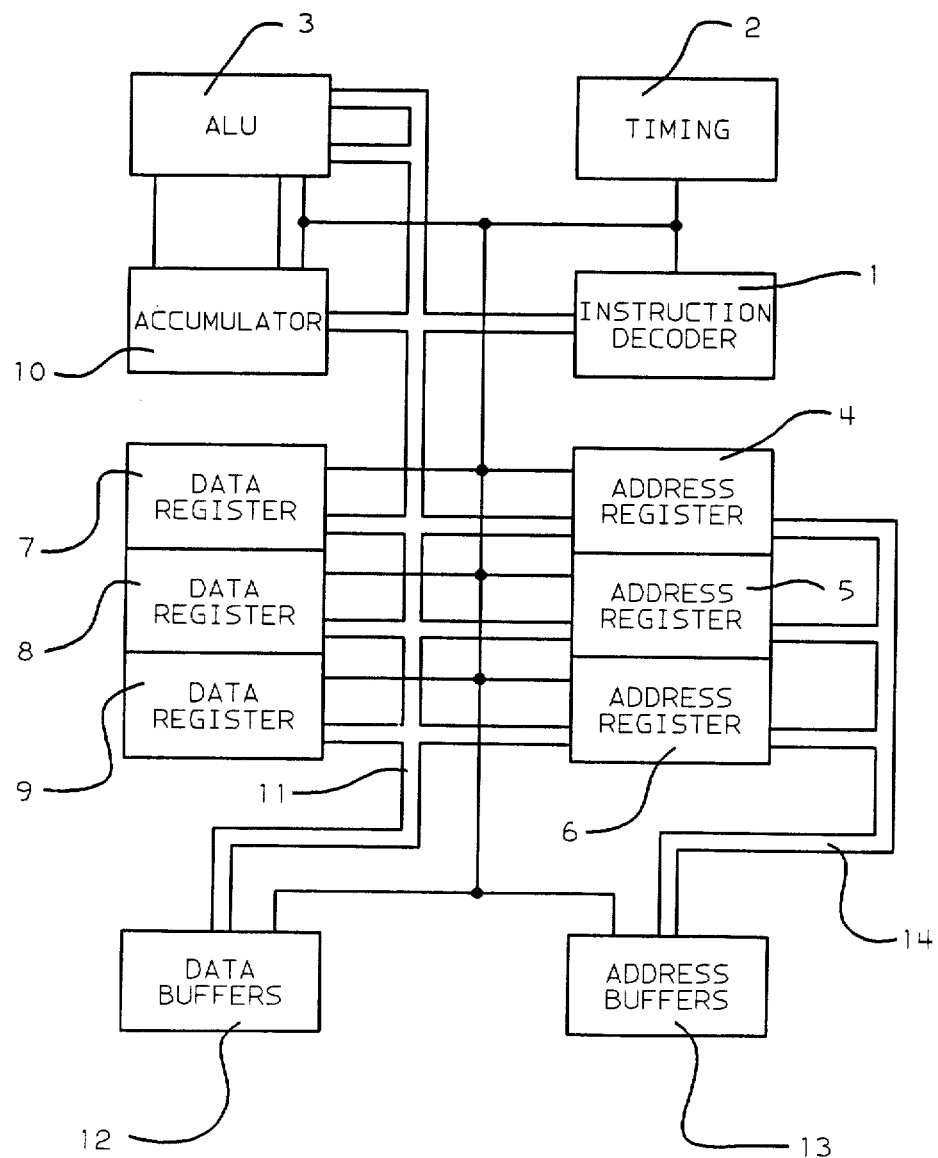
FIG. 1 is a block schematic of a microprocessor central processing (CPU) chip.

Referring now more particularly to the drawings, a typical microprocessor CPU chip consists of several separate logical sections as shown in FIG. 1. A control ROM (read-only memory) 1, decodes instructions one at a time and directs the operation of the rest of the CPU chip. A timing and sequence logic unit 2 steps each operation through in its proper order. An ALU (arithmetic logic unit) 3 performs basic arithmetic and logical operations on operands that are fed through it. There are normally a number of registers of various sizes located on the CPU chip itself. Address pointer registers 4, 5, 6 are provided the width of which is dependent on the size of memory the system is designed to handle and on whether the memory being addressed is in the CPU or external to it. There are data registers 7, 8, 9, 10, for storing and transferring data, and at least one of these registers is normally a special-purpose working register called an accumulator 10. The accumulator 10 is involved in most of the data-oriented activity on the CPU. (The results of most of the ALU operations are sent to the accumulator, and its contents are quite often used as one of the operands.) Connecting all of these elements is a data bus 11 whose width is determined by the microprocessor word size. The data bus, with bidirectional buffers 12 at the boundary of the CPU chip, becomes the local system data but and acts as the information path connecting all data-related elements in the system.

The contents of the active address pointer register generally, follow a separate path 14 to the boundary of the CPU chip, where it passes through address buffers 13 to become the local system address bus. A 16-bit address bus allows addressing of 65,536 (often referred to as "64K") separate memory locations, and a 20-bit address bus allows for over a million or 1M. A 24-bit address gives 16M possibilities. In an effort to reduce the number of pins on the CPU package, some microprocessors multiplex some portion of the address bus and data bus on the same group of pins as they leave the CPU chip. This saves pins on the CPU, but requires that extra hardware be added to create individual address and data busses to serve the rest of the system. This is of little consequence in larger systems, however, because the local address and data busses must be buffered again before being distributed to a large number of memory and peripheral chips, and the demultiplexing and buffering can both be done by the same devices. (The address bus is unidirectional only, out of the CPU, but the data bus is bidirectional and must be buffered in both directions.)

FIG. 2 shows the processor of FIG. 1 (20) connected to read only memory (ROM) 21, Random Access Memory (RAM) 22, and a set of input/output control units 23. The data buffers 12 of the processor are connected through the data bus 25, the control bus 26 connects the ROM, RAM and I/O units to the control and timing unit 2 and the address buffers 13 are connected through a bus 27 to an address remapper unit 24 (FIG. 3) and then through bus 28. A reset line 29 connects the I/O unit 23 to the processor and a set line 30 connects the I/O unit to the address remapper.

In the preferred embodiment of the invention, the ROM, 21 responds to addresses in the ranges 936K-1-Meg and 15.936 Meg to 16 Meg. The RAM responds to addresses in the ranges 0–640K and 1Meg–15Meg. The ROM contains the power-on routine, and the RAM contains the mode switch routine.

The address remapper unit 24 is shown in detail in FIG. 3. The address bus 27 has 24 bit lines (A0–A23) of which A20 is connected to a two input multiplexor chip 32. The second input 30 to the chip 32 comes from the I/O slave processing chip 23. Microprocessor chip 20 also receives an input from chip 23 on the reset line 29.

When the microprocessor receives an input signal to indicate that it should start operation its first action is go to its power-on address where is found the Power-on self test routine (POST). The power-on address in hexadecimal is expressed as FFFFF0 (24 bits).

The remapper shown in FIG. 3 allows the processor to by-pass the POST routines for the purpose of mode switching as follows. A Mode Switching routine is stored in RAM 22 at the address EFFFF0 which is one bit, in the most significant four bits, different that FFFFF0 (the address of POST).

When the remapper is activated by a '1' value on its 'select' input 30 from the I/O units, whatever value appears on line A20 is converted to a '0' bit before being passed on to the rest of the computer system.

If the I/O units now generate a reset online (29) the restart address is converted to EFFFF0 which is the mode switching routine address.

The mode switching routine performs the following actions:
(a) masks off interrupts,
(b) stores in RAM the relevant processor information such as one or more routine addresses to be branched to when the mode switch is complete, a task identifier that indicates the task to be dispatched in the new mode,
(c) activates the remapper 24(32),
(d) activates the reset (29),
(e) releases the remapper,
(f) loads the saved RAM information into the processor,
(g) enables interrupts.

The preferred embodiment of the remapper described above is as simple as possible, but remaps half the addresses of the machine. However, it should be clear that a more complex remapper could be devised which changes fewer addresses. In particular, a remapper which changed only the addresses of the first instruction of the start-up routine would be ideal, but would require more circuits.

The mode switching routine described above activates and releases the remapper on every switch. Alternatively, the preferred embodiment does not do this but leaves the remapper permanently active after initial start-up.

What is claimed is:

1. A microprocessor comprising a processor unit, a read only memory, a random access memory and an input-output unit connected by a control bus, a data bus and an address bus and which has at least a first mode and a second mode of operation for the generation of memory location addresses, characterized in that the microprocessor also includes a remapper unit connected in the address bus between the processor unit and the read only memory and te random access memory, means when changing modes for providing an enable signal to said remapper unit, said remapper unit responsive to said enable signal to selectively change address words generated by the processor.

2. A microprocessor as claimed in claim 1 in which the remapper unit connected in the address bus receives one bit of each address word generated by the processor unit and when enabled replaces the value of said one bit with a different value.

3. A microprocessor as claimed in claim 1 in whicht he first mode provides an address that invokes a power-on start-up control program and the second mode provides an address that bypasses the power-on start-up program which differs by one bit from the address of the first mode and invokes a mode switching control program.

4. A microprocessor as claimed in claim 3 in which the mode switching control program controls the processor to perform the following functions:
(a) mask off interrupts,
(b) store in random access memory the relevant processor information,
(c) activate the remapper,
(d) activate the reset,
(e) release the remapper,
(f) load the information saved at (a) into the processor, and
(g) enable interrupts.

5. A microprocessor as claimed in claim 2 in which the first mode provides an address that invokes a power-on start-up control program and the second mode provides an address that bypasses the power-on start-up control program which differs by one bit from the address of the first mode and invokes a mode switching control program.

6. A microprocessor as claimed in claim 5 in which the mode switching control program controls the processor to perform the following instructions:
(a) mask off interrupts,
(b) store in random access memory the relevant processor information,
(c) activate the remapper,
(d) activate the reset,
(e) release the remapper,
(f) load the information saved at (a) into the processor, and
(g) enable interrupts.

7. In a microprocessor of the type comprising a processor unit, a read only memory, a random access memory and an input-output unit connected by a control bus, a data bus and an address bus and which has at least a first mode and a second mode of operation for the generation of memory location addresses, said processor in response to a mode change providing an address on the address bus that causes a power-on start-up program to be invoked, the improvement for bypassing the power-on start-up program comprising:
a remapping unit connected in the address bus between the processor unit and the read only memory and the random access memory and
means for providing an enable signal when changing modes to said remapper unit,
said remapper unit responsive to said enable signal to change the address generated by the processor to an address which bypasses the power start-up program.

8. In a microprocessor of the type comprising a processor unit, a read only memory, a random access memory and an input-output unit connected by a control bus, a data bus and an address bus and which has at leas a normal mode and protected mode of operation for the generation of memory location addresses, said processor normally in response to the normal mode providing an address on the address bus that causes a power-on start-up program to be invoked, the improvement for bypassing the power-on start-up program when after being in the protected mode, switching back to the normal mode comprising:
said read only memory providing at a given address operation in the normal mode with the power-on start-up program, said random access memory providing at address one bit different from said given address a program that puts the operation in the normal mode without the power-on start-up program, a remapper unit connected in one line of the address bus between the processor switching unit and the read only memory and the random access memory and means for providing an enable signal to said remapper unit when changing from said protected mode back to said normal mode, said remapper unit responsive to said enable signal to change by one bit the address generated by the processor to provide the address which bypasses the power-on start-up program.

* * * * *